United States Patent [19]

Reynolds

[11] Patent Number: 5,199,279
[45] Date of Patent: Apr. 6, 1993

[54] DRUM CONTACT FREEZER SYSTEM AND METHOD

[76] Inventor: Martin M. Reynolds, 16809 N. 59th St., Scottsdale, Ariz. 55254

[21] Appl. No.: 744,483

[22] Filed: Aug. 13, 1991

[51] Int. Cl.$^5$ ............................................. A23G 9/18
[52] U.S. Cl. ......................................... 62/346; 165/89
[58] Field of Search ............................. 62/346; 165/89

[56] References Cited

U.S. PATENT DOCUMENTS

| | | | |
|---|---|---|---|
| 944,625 | 12/1909 | Milburn | 62/346 X |
| 2,749,722 | 6/1956 | Knowles | 62/346 |
| 3,152,453 | 10/1964 | Hamilton | 62/346 X |
| 3,774,409 | 11/1973 | Perrson et al. | 62/346 X |
| 4,098,095 | 7/1978 | Roth | 62/346 |
| 4,138,768 | 2/1979 | Roth | 17/32 |
| 4,192,899 | 3/1980 | Roth | 426/513 |
| 4,239,785 | 12/1980 | Roth | 426/266 |
| 4,294,860 | 10/1981 | Roth | 426/417 |
| 4,337,627 | 7/1982 | Roth | 62/346 |
| 4,349,575 | 9/1982 | Roth | 62/346 X |
| 4,446,159 | 5/1984 | Roth | 426/249 |
| 4,450,183 | 5/1984 | Steinberg et al. | 426/646 |
| 4,456,624 | 6/1984 | Glantz et al. | 426/96 |
| 4,478,861 | 10/1984 | Montgomery et al. | 426/295 |
| 4,567,050 | 1/1986 | Roth | 426/417 |
| 4,804,551 | 2/1989 | Matthews et al. | 426/518 |
| 4,914,927 | 4/1990 | Miller et al. | 62/381 |
| 4,934,928 | 6/1990 | Akamatsu | 165/89 X |

FOREIGN PATENT DOCUMENTS 1233011  4/1959  France ................................. 62/346

OTHER PUBLICATIONS

Rota-Freeze IQF In-Line System-Drum Freezer Type H 1200 Basic, Atlas Denmark.
GMF Goude Drum Flakers, Goudsche Machinefabriek B.V., Kattensingel 21, 2801 CA Gouda, Holland.
Reno Technology, P.O. Box 1570, Hutchinson, Kansas 67504-1570.

*Primary Examiner*—William E. Tapolcai
*Attorney, Agent, or Firm*—Sheridan Ross & McIntosh

[57] ABSTRACT

A drum contact freezer system which reduces or eliminates a stagnant layer of refrigerant on an interior surface of the drum freezers is provided. A boiling refrigerant is sprayed into the interior of the drum freezers to scrub an interior surface thereof having the stagnant layer. This scrubbing reduces or eliminates the stagnant layer and thus provides an enhanced rate of heat transfer. The boiling refrigerant is preferably in a temperature range of approximately $-100°$ F. to $-40°$ F. at or near atmospheric pressure. Additionally, the boiling refrigerant may be circulated within the drum freezers by providing troughs on the interior surface thereof to help lift the boiling refrigerant and prolong contact between the boiling refrigerant and the interior surface of the drum freezers to provide a further enhanced rate of heat transfer. The material to be frozen may be provided on an outer surface of the drum freezers using a drop nose feed conveyor, soft sponge rollers, or a sprayer assembly depending upon the type of material to be frozen.

24 Claims, 3 Drawing Sheets

DRUM CONTACT FREEZER SYSTEM AND METHOD

FIELD OF THE INVENTION

The present invention relates to rotating contact freezers, and more particularly to drum and wheel contact freezers for rapid freezing of food products and other materials by providing an enhanced rate of heat transfer by reducing an insulating layer which builds on an interior surface of the contact freezer.

BACKGROUND OF THE INVENTION

Drum contact freezers are widely used for rapid freezing of food products and other materials. Such devices freeze a material by placing the material on an outer contact surface of a drum while the drum is rotated. Refrigerant such as FREON, ammonia, or D-limonene-carbon dioxide is provided to the interior of the drum to cool the external surface thereof and normally operate in a range of $-100°$ F. to $-30°$ F. The material in contact with the outer drum surface is frozen by heat transfer. Additionally, some drum freezer systems enhance freezing of the material by providing an additional coolant exterior of the drum near the material to be frozen. For example, the additional coolant may be provided on the outer drum surface or on a web which is used to press the material to be frozen against the outer drum surface.

As the drum freezer and the material to be frozen rotate together, the refrigerant within the drum sequentially contacts different portions of the inner drum surface (unless the drum is completely filled). A recurring problem with known contact drum freezer systems has been build up of a stagnant layer on the internal surface of the drum due to the manner in which the refrigerant circulates and contacts different portions of the inner drum surface. This stagnant layer on the inner drum surface can cause a significant reduction in the heat transfer rate.

When using D-limonene-carbon dioxide and when moisture is present the stagnant layer tends to create an insulating layer thereon and effectively increases the thickness of the drum through which heat must be transferred. Thus the rate at which food may be frozen is decreased and in some cases causes inadequate freezing thereof and resultant health concerns. The overall efficiency of the known systems is therefore less than desirable and is further decreased by the need for relatively frequent shutdowns to clean the stagnant layer from the drum surfaces.

Due to limitations on efficiency and the rate of heat transfer, known freezer systems also have a fairly narrow range of food products that can be frozen. Some food products such as liquid eggs (and other liquids) are inadequately frozen and/or have a resulting bad taste when using the freezers known in the art.

Therefore, there is a need for a drum contact freezer system in which the stagnant layer on the interior surface of the drum may be reduced or eliminated to enhance the rate of heat transfer and allow faster freezing plus a wider range of allowable food products.

SUMMARY OF THE INVENTION

An object of the present invention is to provide a drum contact freezer device which reduces or eliminates a stagnant insulating layer of refrigerant on an interior surface of the drum freezer.

Another object of the present invention is to provide an enhanced heat transfer rate by a drum contact freezer without the necessity of an additional exterior coolant.

The above objects of the present invention can be fulfilled by providing a boiling refrigerant to the interior of the drum freezer to scrub an interior surface thereof. A boiling refrigerant meeting the requirements of the present invention enables relatively higher heat transfer than previously known devices by providing a boiling action which effectively tears up the stagnant insulating layer from the interior surface of the drum. By destroying the stagnant insulating layer, the boiling action improves heat transfer by as much as five to twenty times over prior art drum freezers. Such a dramatic increase in the performance of the freezer system allows faster freezing (allowing safer and less contaminated products) and better overall system performance.

In one embodiment the present invention, the boiling refrigerant, at or near atmospheric pressure, is sprayed against the interior surface of the drum freezer. The drum is approximately ⅛ to ¼ filled with the refrigerant at all times. The liquid and vapor refrigerant is recycled from the drum insomuch as there is a closed loop system to replenish the boiling refrigerant supply.

In another embodiment, troughs upwardly oriented with the rotational direction may be provided on the interior surface of the drum to help lift a refrigerant (boiling or otherwise) beyond the level of fill to prolong contact between the refrigerant and the interior surface of the drum freezer and thus provide even further enhancement of heat transfer. Additionally, by spraying and lifting the boiling refrigerant to prolong contact with the interior surface of the drum freezer, the stagnant layer is further reduced.

In one embodiment, the drum contact freezer system includes a pair of counter-rotating contact freezer drums which freeze both sides of the material to be frozen. The contact freezing system includes an enclosure for the counter-rotating drum freezers to reduce the likelihood of externally contaminating the contact surfaces of the drums such as with water vapor, etc. Such external contamination can hamper the surface's hydrophilic or hydrophobic (depending on the material to be frozen) characteristics. The drum freezers each have a relatively small diameter yet have a total active freezing surface equal to or greater than that of a large diameter single drum freezer and is less expensive to construct. Additionally, the required shell thickness of small diameter drums for use at relatively low pressures is less than that of a large single drum unit for operation at higher pressures. This enables a higher rate of heat transfer since there is less shell thickness.

The boiling refrigerant used in the interior of the contact freezer drum according to the present invention may comprise, for example, "FREON" (such as R502 or R22), $CO_2$, propane, or any other refrigerants which boil at a temperature in a range of approximately $-10020$ F. to approximately $-40°$ F. Use of these refrigerants provides quicker cooling relative to prior art drum contact freezers, which generally use refrigerants that do not provide such low temperatures. Additionally, the freezer drum system of the present invention operates at a relatively low pressure which is advantageous since no extra structural reinforcement is necessary as would be required in higher pressure systems.

For example, if $CO_2$ is employed as the refrigerant, a pressure of approximately 75 psi–100 psi can be utilized, and even lesser pressures (e.g., less than approximately 60 psi) can be employed when "FREON" and other like refrigerants are employed.

The drum contact freezer system according to the present invention allows an enhanced rate of heat transfer in comparison to previous systems. The stagnant insulating layer of refrigerant on the interior surface of the drum in prior systems is torn down and removed by the boiling action of the boiling refrigerant providing a much greater rate of heat transfer. Therefore, the material to be frozen may be frozen comparatively faster with less risk of bacterial contamination. Better and faster freezing of the material improves performance of the system allowing more production of the material to be frozen in a given amount of time. Additionally, the shelf life of the frozen material is materially lengthened due to the rapid rate of freeze by cryogenic pasteurization.

BRIEF DESCRIPTION OF THE DRAWINGS

Other features and advantages of the present invention will become apparent from the following Detailed Description taken in connection with the accompanying Drawings, in which.

DETAILED DESCRIPTION OF THE INVENTION

Figure 1:
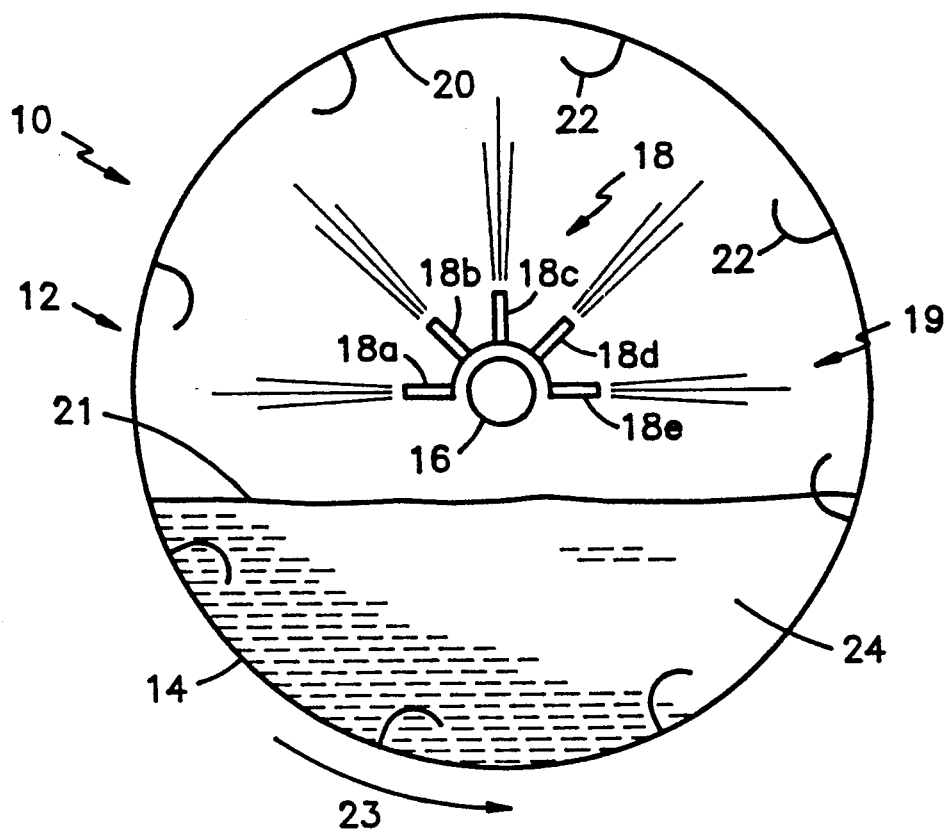
FIG. 1 illustrates a cross-sectional end view of a single drum contact freezer system of the present invention.

FIG. 1 illustrates in a cross-sectional end view, a drum contact freezer system 10 according to one embodiment of the present invention. The drum contact freezer system 10 includes a rotating drum 12 having an outer surface 14 thereof which is used for contact with the material to be frozen. Drum 12 additionally includes a journal tube 16 through which a boiling refrigerant, generally indicated by reference numeral 24, is provided thereto. A boiling refrigerant is provided to scrub off or tear away any insulating layer of stagnant refrigerant which may be within the drum 12, as will be subsequently described in greater detail. A stationary sprayer assembly 18 is positioned within an interior 19 of the drum 12 and interconnected to the journal tube 16. The sprayer assembly 18 includes, for example, a plurality of individual sprayer heads 18a, 18b, 18c, 18d and 18e.

The boiling refrigerant 24 is provided through the journal tube 16 to the individual sprayer heads 18a, 18b, 18c, 18d and 18e in a manner which is known in the art. The sprayer heads 18a, 18b, 18c, 18d and 18e spray the boiling refrigerant 24 against an interior surface 20 of drum 12. Spraying the boiling refrigerant 24 against the interior surface 20 provides an enhanced rate of heat transfer by further scrubbing and impingement of the interior surface 20 to reduce the insulating layer of stagnant refrigerant thereon.

The boiling refrigerant 24 is kept at a predetermined level 21 within the drum 12. For example, the level 21 of the refrigerant 24 is between less than ½ full and more than ¼ full. By keeping the refrigerant level 21 less than ½ full it is relatively easier to return any refrigerant vapor created during the scrubbing and freezing process. It is also easier to keep the refrigerant 24 within the drum 12 closer to its boiling point by keeping the amount therein relatively low, thus reducing the dwell time of the refrigerant 24 within the drum 12. In contrast, it is preferable to maintain some refrigerant 24 in the drum 12 to supplement the spray assembly 18.

Troughs 22 are attached to the interior surface 20 of drum 12 in order to prolong contact between the boiling refrigerant 24 and the interior surface 20. Since they are attached to the interior surface 20, the troughs 22 rotate with the drum 12 in, for example, a counter clockwise direction, as shown by an arrow 23. As the troughs 22 rotate from the bottom of the drum 12 as shown in FIG. 1, the boiling refrigerant 24 is lifted by the troughs 22 beyond the level 21. Thus the boiling refrigerant 24 remains in contact with the interior surface 20 of the drum 12 after the troughs 22 rotate above the boiling refrigerant level 21. In this manner, the troughs 22 prolong contact between the boiling refrigerant 24 and the interior surface 20 to provide greater removal of any stagnant refrigerant and thus further enhance the rate of heat transfer.

Figure 2:
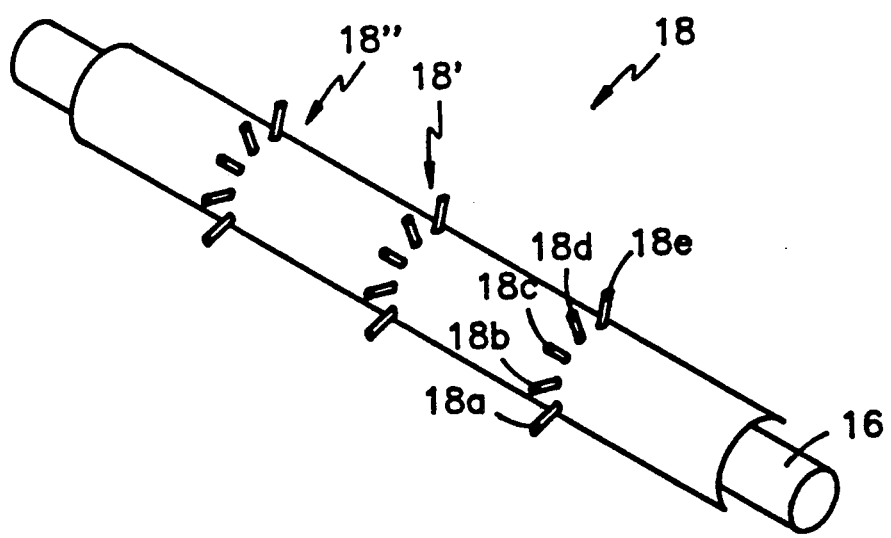
FIG. 2 illustrates a perspective view of a sprayer assembly of the present invention.

FIG. 2 illustrates an isometric view of the sprayer assembly 18 of FIG. 1. In addition to the individual sprayer heads 18a, 18b, 18c, 18d and 18e, two additional rows 18' and 18" of sprayer heads are provided The additional sprayer head rows 18' and 18" are included in the sprayer assembly 18 to enable a more uniform contact along the interior surface 20 of drum freezer 12 above the level 21. Although FIGS. 1 and 2 illustrate an embodiment of a drum freezer including three rows of sprayer heads, each row having five sprayer heads, alternative arrangements and numbers of individual sprayer heads may be used in practicing the present invention. The sprayer heads may comprise precision orifices such as, for example, Flat Fan Spray (TG) nozzles available from the Spray Systems Corporation.

Figure 3:
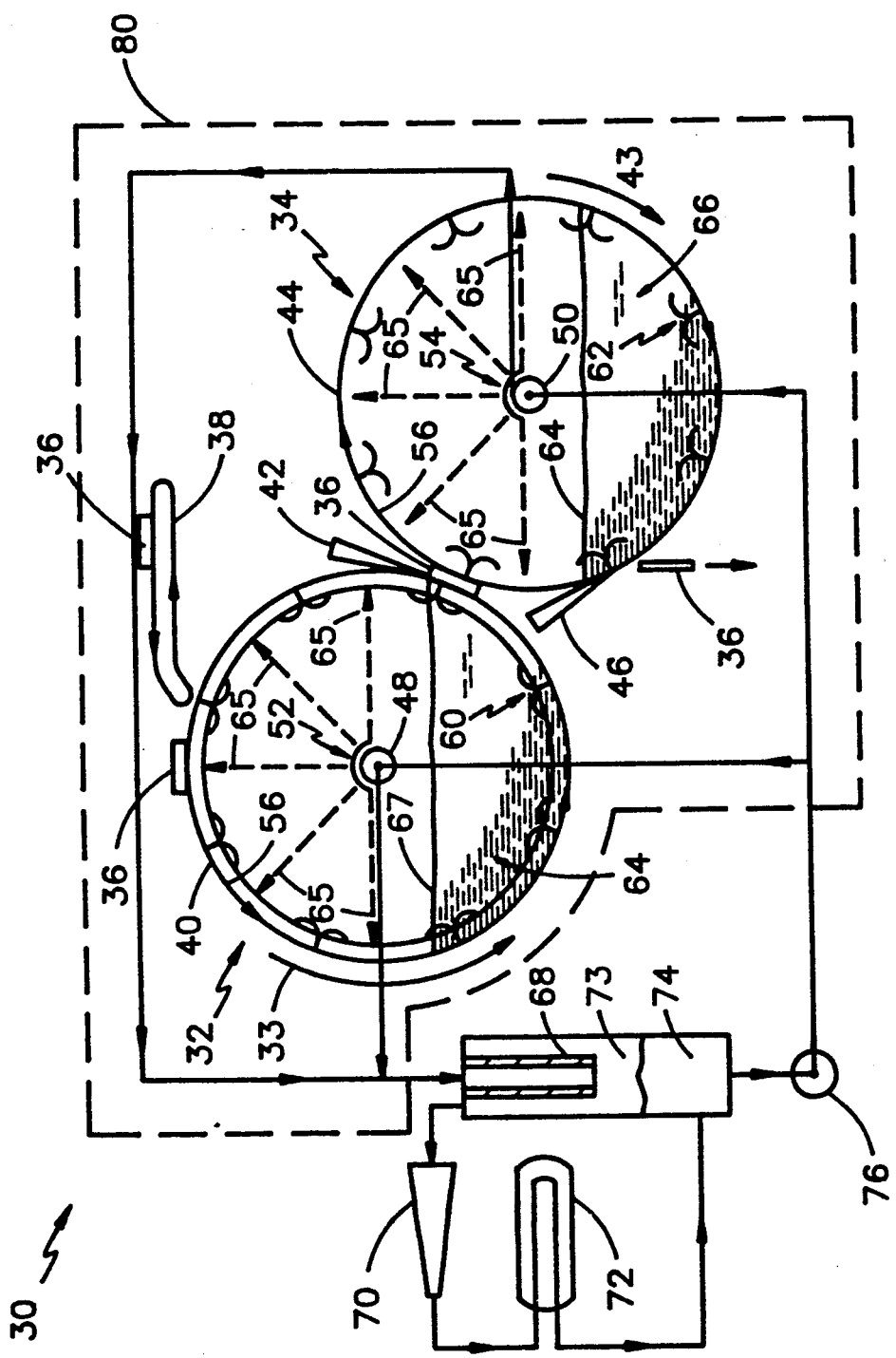
FIG. 3 illustrates a twin counter-rotating drum contact freezer system according to another embodiment of the present invention.

A drum contact freezer system 30 is illustrated in FIG. 3 according to another embodiment of the present invention. The drum contact freezer system 30 includes a pair of counter-rotating contact freezer drums 32 and 34 which sequentially freeze both sides of a material to be frozen 36 such as, for example, meat paste, fish fillets, chicken breasts, eggs, soup, milk, yogurt, juice, gum, organic films, and etc. The counter-rotating contact freezer drums 32 and 34 may rotate, for example, in a range of from 1 to 30 RPM depending on the speed required to freeze the particular material being frozen.

A drop nose feed conveyer system 38 provides the material 36 to an outer surface 40 of the drum freezer 32. Alternatively, a shuttle conveyor could be employed. The material 36 sticks to and rotates with the outer surface 40 of the drum 32 in a counter-clockwise direction, as indicated by an arrow 33, for freezing of a first side thereof. A doctor knife 42 removes the material 36 from the outer surface 40 for transfer to an outer surface 44 of the drum freezer 34. The material to be frozen 36 then rotates in a clockwise direction, as indicated by an arrow 43, with the outer surface 44 around the drum freezer 34 as a second side of the material 36 is frozen. A second doctor knife 46 is provided to remove material 36 from the outer surface 44 of the drum freezer 34. As the material to be frozen 36 rotates around the outer surfaces 40 and 44 of drum freezers 32 and 34, the material 36 may experience some degree of contraction which tends to loosen it from the freezer surfaces 40 and 44 which comprise metal. In this manner, the doctor knives 42 and 46 are able to easily remove the material 36 from the surfaces 40 and 44, respectively.

A boiling refrigerant, as indicated generally by reference numerals 64 and 66, is provided through a journal tube 48 to the freezer drum 32 and a journal drum 50 to the freezer drum 34, respectively. The boiling refrigerant 64 and 66 is directed from the journal tubes 48 and 50 to sprayer assemblies 52 and 54, respectively. The sprayer assemblies 52 and 54 are similar to the sprayer assembly 18 previously described in reference to FIGS. 1 and 2 above. The sprayer assemblies 52 and 54 spray the boiling refrigerant 64 and 66 on interior surfaces 56 and 58 of the freezer drums 32 and 34, respectively, as indicated by arrows 65. The spray 65 of the boiling refrigerant 64 and 66 scrubs the interior surfaces 56 and 58 to reduce a stagnant insulating layer of refrigerant on the interior surfaces 56 and 58 of the drum freezers 32 and 34. This reduction of the insulating layer of refrigerant provides an enhanced rate of heat transfer.

Pairs of oppositely facing troughs 60 and 62 are provided on the interior surfaces 56 and 58 of the drum freezers 32 and 34, respectively. The troughs 60 and 62 rotate with the interior surfaces 56 and 58 and lift the boiling refrigerant 64 and 66 contained within freezer drums 32 and 34 above a liquid level indicated by reference numerals 67 and 69 to prolong contact with the interior surfaces 56 and 58. The troughs 60 and 62 carry the boiling refrigerant 64 and 66 above the liquid levels 67 and 69 approximately 30° past a top center position of each drum. The prolonged contact of the boiling refrigerant 64 and 66 with the interior surfaces 56 and 58 provided by the troughs 60 and 62 further enhances the rate of heat transfer by further reducing any insulating layer of stagnant refrigerant on the interior surfaces 56 and 58. By spraying the boiling refrigerant 64 and 66 within the drum freezers 32 and 34 and by using the troughs 60 and 62 to prolong contact of the boiling refrigerant 64 and 66 with the interior surfaces 56 and 58, the rate of heat transfer may be enhanced by as much as 5-20 times over freezer systems known in the art. While the contact drum freezer system 30 has been described using troughs 60 and 62, other devices for lifting the liquid refrigerant 64 and 66 may be used such as, for example, solid heat transfer rings.

During the freezing/scrubbing process, some of the refrigerant 64 and 66 is vaporized creating a wet gas. The wet gas is removed from the drum freezers 32 and 34 via exit portions of the journal tubes 48 and 50. The wet gas, along with some of the liquid refrigerant 64 and 66, for recycling is transferred from the tubes 48 and 50 to a liquid-gas separator 68, as is known in the art. The gas portion of the wet gas is transferred from the liquid-gas separator 68 to a screw compressor 70 and a condenser 72 which are used to convert the gas back into a liquid which is then provided to liquid receiving end 73 of the liquid-gas separator 68. The liquid from the wet gas and the liquid provided from condenser 72 are stored in the liquid receiving end 73 as a liquid refrigerant 74. This boiling refrigerant is then transferred from a circulating pump 76 to the freezer drums 32 and 34 via journal tubes 48 and 50, respectively.

An enclosure, as indicated by a dashed line 80, is provided around the drum freezers 32 and 34 to inhibit contamination from external sources. The enclosure 80 protects the hydrophobic or hydrophilic characteristic of the drum surfaces 40 and 44 depending upon the nature of the material 36. As a result, the material 36 will stick to the surfaces 40 and 44 which helps the rate of heat transfer and removes the necessity for belts, rollers or other devices to hold the material 36 in place. Additionally, the enclosure 80 inhibits entrance of airborne contaminants to the surfaces 40 and 44. Such contaminants could be transferred to the material 36 to be frozen 36 during the freezing process creating a potential health hazard.

Although not shown, it is to be understood that the freezer drums 32 and 34 are sealed in a appropriate manner to inhibit leakage of the boiling refrigerant 64 and 66 or the vapor therefrom. Additionally, although not shown in FIG. 3, the drop nose feed conveyor system 38 is provided with an appropriate seal through the enclosure 80 to further inhibit contamination within the enclosure 80.

While the drum contact freezer system 30 mounted within the enclosure 80 has been shown in a single position, variable drum positions may be provided based upon thickness of the material 36. The variable positions are accomplished by adjustable devices, as are well known, to move the drums 32 and 34 closer together or farther apart.

The refrigerant 64 and 66 of the present invention may comprise, for example, "FREON" (R502 or R22), $CO_2$, or propane. These refrigerants boil at a temperature and pressure sufficient to scrub the insulating layer of stagnant refrigerant and produce a high heat transfer rate. The refrigerants used to practice the present invention preferably boil in a temperature range of approximately $-40°$ F. to $-100°$ F. to provide rapid heat transfer. Additionally, the pressure needed to boil the refrigerants is less than approximately 60 psi and preferably at or near atmospheric pressure (i.e., 14.7 p.s.i). A freezer drum able to operate with such low pressure is advantageous since no extra structural reinforcement is necessary to withstand higher pressure.

In one example, the system 30 uses "FREON" 502 for freezing 4 ounce hamburger patties. The meat enters the system 30 approximately 35° F. and exits the system 30 at 0° F. The drums 32 and 34 rotate one revolution every 25 seconds and each has a diameter of 5 feet with a width of 3 feet. Using this configuration approximately 4500 pounds of meat patties may be frozen per hour. The capacity could be further increased depending on, for example, the fat ratio of the material 36 and the capacity of screw compressor 70 and condenser 72.

Figure 4:
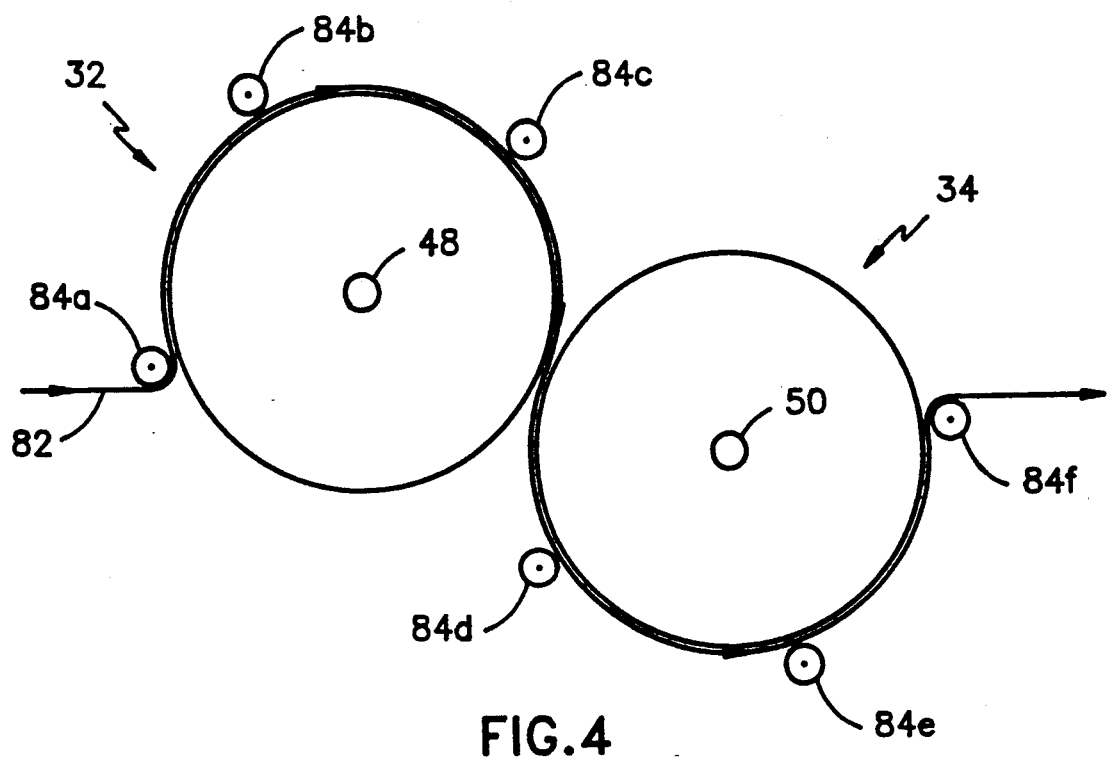
FIGS. 4 and 5 illustrate alternative feed mechanisms for the drum freezers according to the present invention.

The embodiment of FIG. 3 uses a drop nose feed conveyor 38 to provide the material 36 to the drum freezers 32 and 34. A drop nose feed conveyor is particularly useful when the material 36 is a product such a meat patty, a fish fillet, a chicken breast, or a steak, etc. However, other feed mechanisms are particularly advantageous when other types of materials are to be frozen. For example, as illustrated in FIG. 4, when a sheet of dry film such as gum or an organic film which will not stick to the drum freezer surfaces are to be chilled, a different type of feed mechanism can be used. As illustrated in FIG. 4, an organic film 82 to be chilled is contacted with drum freezers 32 and 34 using a plurality of sponge rollers 84a, 84b, 84c, 84d, 84e and 84f. Since the organic film 82 does not stick to drum freezers 32 and 34, sponge rollers 84a, 84b, 84c, 84d, 84e and 84f help maintain contact between organic film 82 and drum freezers 32 and 34 for more efficient and quicker chilling thereof.

Figure 5:
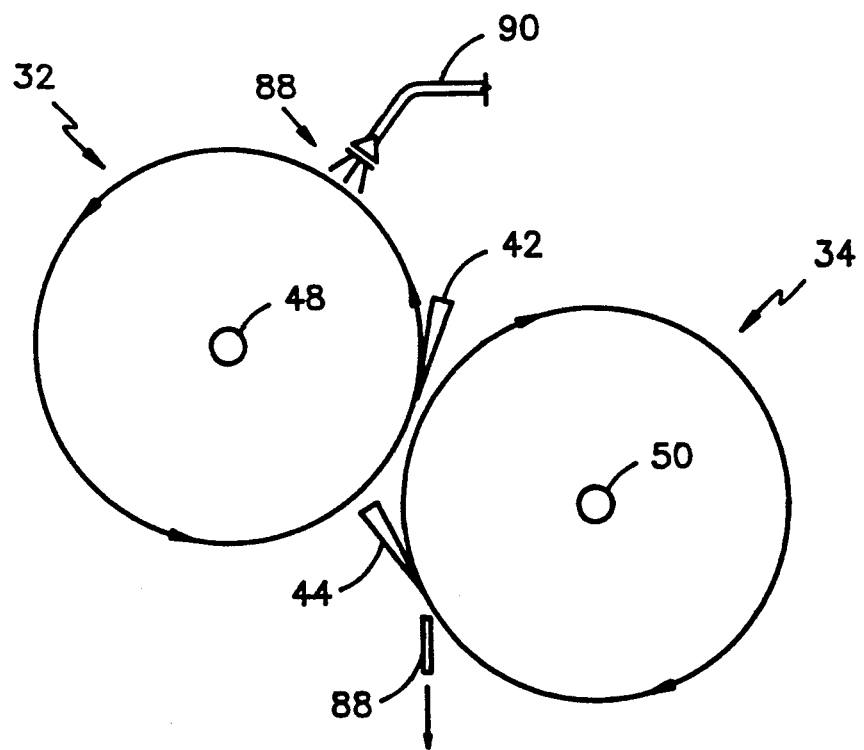

FIG. 5 illustrates a drum contact freezer system according to the present invention in which the material 88 to be frozen is sprayed onto the drum freezer 32 using a sprayer assembly 90. The embodiment of FIG. 5 can be used when the material 88 is a liquid material such as shelled eggs, soup, milk, yogurt, juices, or animal blood.

From the foregoing description, it will be appreciated by those skilled in the art that modifications or improvements may be made to the embodiments disclosed herein without departing from the concepts disclosed. The scope of protection afforded is to be determined by the claims which follow and the breadth of interpretation that the law allows.

What is claimed is:

1. An apparatus for contact freezing a material, comprising:
   a) a rotating drum assembly comprising two counter-rotating drums, each drum having:
      i) an outer rotating surface for contacting a material to be frozen; and
      ii) an inner rotating surface defining an interior having an upper region and a lower region;
   b) a refrigerant having a boiling temperature in a range of approximately −100° F. and −40° F.;
   c) means for spraying said refrigerant at approximately its boiling temperature against said inner rotating surface in said upper region of said interior of each said drum; and
   d) means for removing said refrigerant from said interior of each said drum, wherein a predetermined volume of said refrigerant is maintained in said lower region of each said drum and the pressure in said interior of each said drum is maintained below about 100 psi, wherein, after said inner rotating surface rotates through said predetermined volume of said refrigerant in said lower region of each said drum, said sprayed refrigerant scrubs said inner rotating surface in said upper region of each said drum.

2. The apparatus as claimed in claim 1, wherein said drum assembly is enclosed to inhibit contamination from external sources.

3. The apparatus as claimed in claim 1, wherein said interior of each said drum is sealed to inhibit escape of said boiling refrigerant.

4. The apparatus as claimed in claim 1, wherein said predetermined volume comprises between about one-fourth and about one-half of said interior of at least one of said drums.

5. The apparatus as claimed in claim 1, wherein said means for spraying comprises a plurality of spray heads.

6. The apparatus as claimed in claim 1, further comprising means for feeding the material to be frozen to said outer rotating surface of at least one of said drums.

7. The apparatus as claimed in claim 6, wherein said means for feeding comprises means for spraying the material to be frozen onto said outer rotating surface of at least one of said drums.

8. The apparatus as claimed in claim 6, wherein said means for feeding comprises a drop nose feed conveyor.

9. The apparatus as claimed in claim 6, further comprising means for assisting contact of the material with said outer surface of at least one of said drums.

10. The apparatus as claimed in claim 9, wherein said means for assisting contact comprises a plurality of soft sponge rollers for maintaining contact between the material and said outer rotating surface of at least one of said drums.

11. The apparatus as claimed in claim 1, further comprising at least one trough positioned transverse to a circumference on said inner rotating surface of at least one of said drums for containing a portion of said predetermined volume of said refrigerant from said lower region of said at least one of said drums to prolong contact with said inner rotating surface.

12. The apparatus as claimed in claim 11, wherein said at least one trough comprises a plurality of single troughs spaced along said inner rotating surface.

13. The apparatus as claimed in claim 11, wherein said at least one trough comprises a plurality of pairs of oppositely facing troughs spaced along said inner rotating surface.

14. The apparatus as claimed in claim 1, wherein said refrigerant comprises "FREON" R502.

15. The apparatus as claimed in claim 1, wherein said refrigerant comprises $CO_2$ and said pressure is approximately 75–100 psi.

16. The apparatus as claimed in claim 1, wherein said refrigerant comprises "FREON" R22.

17. The apparatus as claimed in claim 1, wherein said refrigerant comprises propane.

18. The apparatus as claimed in claim 1, wherein said interior of each said drum is maintained at a pressure of less than approximately 60 psi.

19. The apparatus as claimed in claim 18, wherein said pressure is approximately atmospheric pressure.

20. The apparatus as claimed in claim 1, further comprising a doctor knife positioned near said outer rotating surface of at least one of said drums for removing the material from said outer rotating surface of said at least one of said drums after it has been frozen.

21. The apparatus as claimed in claim 1, further comprising a plurality of soft sponge rollers for guiding the material around said outer rotating surface of at least one of said drums.

22. The apparatus as claimed in claim 1, further comprising at least one trough positioned transverse to a circumference on said inner rotating surface of at least one of said drums and having a shape for containing a portion of said predetermined volume of said refrigerant from said lower region and retaining said refrigerant within said at least one trough about 30° past a top center position of said interior of said at least one of said drums.

23. An apparatus for use in freezing a material, comprising:
   a) a refrigerant having a boiling temperature in a range of approximately −100° F. and −40° F.;
   b) a pair of counter-rotating contact drum freezers, each having:
      i) an outer rotating surface for receiving and contacting a material to be frozen; and
      ii) an inner rotating surface defining an interior of said drum freezer having an upper region and a lower region, wherein, during operation, said interior contains a predetermined volume of said refrigerant;
      iii) means for spraying said refrigerant at approximately its boiling temperature against said inner rotating surface in said upper region of said interior;

iv) means for removing said refrigerant from said interior, wherein a predetermined volume of said refrigerant is maintained in said lower region and the pressure in said interior is maintained below about 100 psi, wherein, after said inner rotating surface rotates through said predetermined volume of said refrigerant in said lower region, said sprayed refrigerant scrubs said inner rotating surface in said upper region; and v) at least one trough secured to said inner rotating surface for containing a portion of said refrigerant from said lower region to prolong contact between said refrigerant and said inner rotating surface; and c) said drum freezers being positioned substantially adjacent to each other, wherein one side of the material to be frozen contacts said outer rotating surface of a first of said pair of drum freezers and an opposite side of the material subsequently contacts said outer rotating surface of a second of said pair of drum freezers.

24. The apparatus of claim 23, further comprising means for adjusting a space between said pair of drums to accommodate materials of varying thickness.

* * * * *